United States Patent
Nixon et al.

(10) Patent No.: US 8,894,030 B2
(45) Date of Patent: Nov. 25, 2014

(54) DRINK CONTAINER HOLDING APPARATUS

(76) Inventors: Kent Aaron Nixon, Auckland (NZ);
Carissa Ronelle Gordon, Auckland (NZ)

(*) Notice: Subject to any disclaimer, the term of this patent is extended or adjusted under 35 U.S.C. 154(b) by 1862 days.

(21) Appl. No.: 10/568,879

(22) PCT Filed: Aug. 20, 2004

(86) PCT No.: PCT/NZ2004/000192
§ 371 (c)(1),
(2), (4) Date: Jul. 21, 2006

(87) PCT Pub. No.: WO2005/018400
PCT Pub. Date: Mar. 3, 2005

(65) Prior Publication Data
US 2006/0284040 A1  Dec. 21, 2006

(30) Foreign Application Priority Data

Aug. 21, 2003  (NZ) ........................... 527753
Jul. 26, 2004  (NZ) ........................... 534357

(51) Int. Cl.
*A47K 1/08* (2006.01)
*B62J 11/00* (2006.01)
*A47G 23/02* (2006.01)

(52) U.S. Cl.
CPC ............. *A47G 23/0225* (2013.01); *B62J 11/00* (2013.01)
USPC ................ 248/311.2; 248/220.21; 248/309.2; 248/309.1; 220/737; 224/274

(58) Field of Classification Search
USPC ........... 248/311.2, 309.2, 316.1, 315, 288.11, 248/309.1, 313, 374.1, 220.21; 224/274, 224/413, 414, 420; 220/737, 739
See application file for complete search history.

(56) References Cited

U.S. PATENT DOCUMENTS

| | | | | |
|---|---|---|---|---|
| 1,221,658 A | * | 4/1917 | Berry | 248/210 |
| 1,932,625 A | * | 10/1933 | Hopple | 131/232 |
| 2,140,612 A | * | 12/1938 | Zeman | 248/231.85 |
| 2,518,538 A | * | 8/1950 | Giblin | 219/526 |
| 2,683,640 A | * | 7/1954 | Mangine | 248/231.71 |
| 2,893,675 A | | 7/1959 | Smith et al. | |
| 2,926,879 A | * | 3/1960 | Dietrich | 248/311.2 |
| 3,131,842 A | | 5/1964 | Dingle, Jr. et al. | |
| 3,131,900 A | * | 5/1964 | Anderson et al. | 248/210 |
| 3,269,683 A | * | 8/1966 | Shinaver | 248/230.5 |

(Continued)

FOREIGN PATENT DOCUMENTS

| | | |
|---|---|---|
| GB | 2223931 | 4/1990 |
| GB | 2277452 | 11/1994 |
| GB | 2357031 | 6/2001 |

*Primary Examiner* — K Wood
(74) *Attorney, Agent, or Firm* — Young & Thompson

(57) ABSTRACT

A drink container holding apparatus includes an object attachment device (40) including a holder engagement element (5), and a drink container holder (31) including attachment device engagement member (30) to engage with the holder engagement element (5). The holder engagement element (5) and the attachment device engagement member (30) allow relative angular movement between the object attachment device (40) and the holder (31) in a selected plane. The holder (31) and the object attachment device (40) can be engaged or disengaged by orientating the holder engagement element (5) and the attachment device engagement member (30) in a pre-determined relative angular disposition in the selected plane, and moving the attachment device engagement member (30) and holder engagement element (5) relative to each other in a direction perpendicular to the selected plane.

18 Claims, 16 Drawing Sheets

(56) References Cited

U.S. PATENT DOCUMENTS

| | | | |
|---|---|---|---|
| 3,370,820 A * | 2/1968 | Liss et al. | 248/312.1 |
| 3,734,439 A | 5/1973 | Wintz | |
| 3,840,204 A * | 10/1974 | Thomas et al. | 248/311.2 |
| 4,844,399 A | 7/1989 | Harm | |
| 4,878,642 A * | 11/1989 | Kirby, Jr. | 248/311.2 |
| 5,484,129 A | 1/1996 | Megal | |
| 5,738,322 A * | 4/1998 | Huang | 248/278.1 |
| 5,857,601 A * | 1/1999 | Greenwood | 224/409 |
| 5,979,724 A * | 11/1999 | Loewenthal et al. | 224/483 |
| 5,996,957 A * | 12/1999 | Kurtz | 248/311.2 |
| 6,390,427 B1 * | 5/2002 | McConnell et al. | 248/231.61 |
| 6,601,813 B1 * | 8/2003 | Kager et al. | 248/314 |
| 6,644,612 B2 * | 11/2003 | Webb | 248/311.2 |
| 6,663,068 B2 * | 12/2003 | Huang | 248/311.2 |
| 6,679,465 B1 * | 1/2004 | Leasure | 248/229.15 |
| 6,802,483 B1 * | 10/2004 | Leasure | 248/229.15 |
| 6,983,918 B1 * | 1/2006 | Leasure | 248/311.2 |
| 2002/0109062 A1 * | 8/2002 | Fowler | 248/311.2 |

* cited by examiner

_US 8,894,030 B2_

DRINK CONTAINER HOLDING APPARATUS

FIELD OF THE INVENTION

This invention relates to drink container holding apparatus and has been adapted particularly, but not solely, for providing a drink container holder which is suitable for affixing to movable objects such as prams, buggies, wheelchairs, bicycles, golf trundlers and similar objects.

BACKGROUND OF THE INVENTION

Users of objects such as prams, buggies, wheelchairs, bicycles, golf trundlers and similar objects frequently wish to carry a drink container such as a water bottle, for example, while using the object. In the case of bicycles for example, drink containers are often provided affixed to the bicycle frame. A disadvantage with these holders is that they are located in a stationary orientation relative to the frame so they are not always suitable for an open drink container such as a cup. Another disadvantage is that the holder is not always easily removed from the frame to which it is attached.

It is an object of the present invention to provide drink container holding apparatus which obviates or minimises one or more disadvantages of known devices, or to at least provide the public with a useful choice.

DISCLOSURE OF THE INVENTION

Accordingly, the invention broadly consists in a container holding apparatus including an object attachment device adapted for attachment to an object and including a holder engagement means, a drink container holder including attachment device engagement means to engage with the holder engagement means, the holder engagement means and the attachment device engagement means when engaged allowing relative angular movement between the object attachment device and the holder in a selected plane, and the construction and arrangement of the engagement means being such that the holder and the object attachment device can be engaged or disengaged by orientating the holder engagement means and the attachment device engagement means in a pre-determined relative angular disposition in the selected plane and moving the attachment device engagement means and holder engagement means relative to each other in a direction perpendicular to the selected plane to effect engagement or disengagement.

Preferably rotation of the holder relative to the bracket is possible without rotating the attachment device engagement means.

The holder is preferably rotatable through 360° relative to the object attachment device without said pre-determined relative angular disposition of said holder engagement means and said attachment device engagement means occurring.

In a preferred embodiment the attachment device engagement means is separable from the holder.

The holder engagement means preferably includes a receptacle having an entry slot and the bracket engagement means includes a projection adapted to pass through the entry slot.

In another preferred from the object attachment device comprises a bracket provided in at least two parts, at least two of the parts containing a recess which provides said receptacle when the parts are attached to each other.

The parts of the bracket may be fastened to each other about a part of the object to which the apparatus is attached in use.

Each said part of the bracket may include a fastening recess adapted to be provided about a part of the object in use.

The projection is preferably provided on a shaft that can pass through the entry slot.

The receptacle may include support means for receiving and supporting a part of the shaft.

In a preferred form the projection includes two projecting portions, one portion projecting from either side of the shaft and the projections being substantially opposed.

The entry slot may be oriented so that it is at an angle of substantially 45 degrees to 90 degrees to the usual orientation of the projection in use.

The holder preferably includes a frame to carry or hold a drink container.

In a preferred form of the invention rotation of the holder relative to the bracket is possible without rotating the bracket engagement means.

The holder is preferably rotatable through 360° relative to the bracket without said pre-determined relative angular disposition of said holder engagement means and said bracket engagement means occurring.

The attachment device engagement means is preferably separable from the holder.

The object attachment device may comprise an adhesive surface for attachment of the object attachment device to an object.

The object attachment device may comprise a suction cup for attachment of the object attachment device to an object.

The object attachment device preferably includes a lever operable to move at least a part of the suction cup relative to the object attachment device to form a vacuum between the suction cup and a surface of the object to thereby attach the object attachment device to the object.

BRIEF DESCRIPTION OF THE DRAWINGS

One or more examples of embodiments of the invention will be described with reference to the accompanying drawings in which.

BEST MODES FOR PERFORMING THE INVENTION

Figure 1:
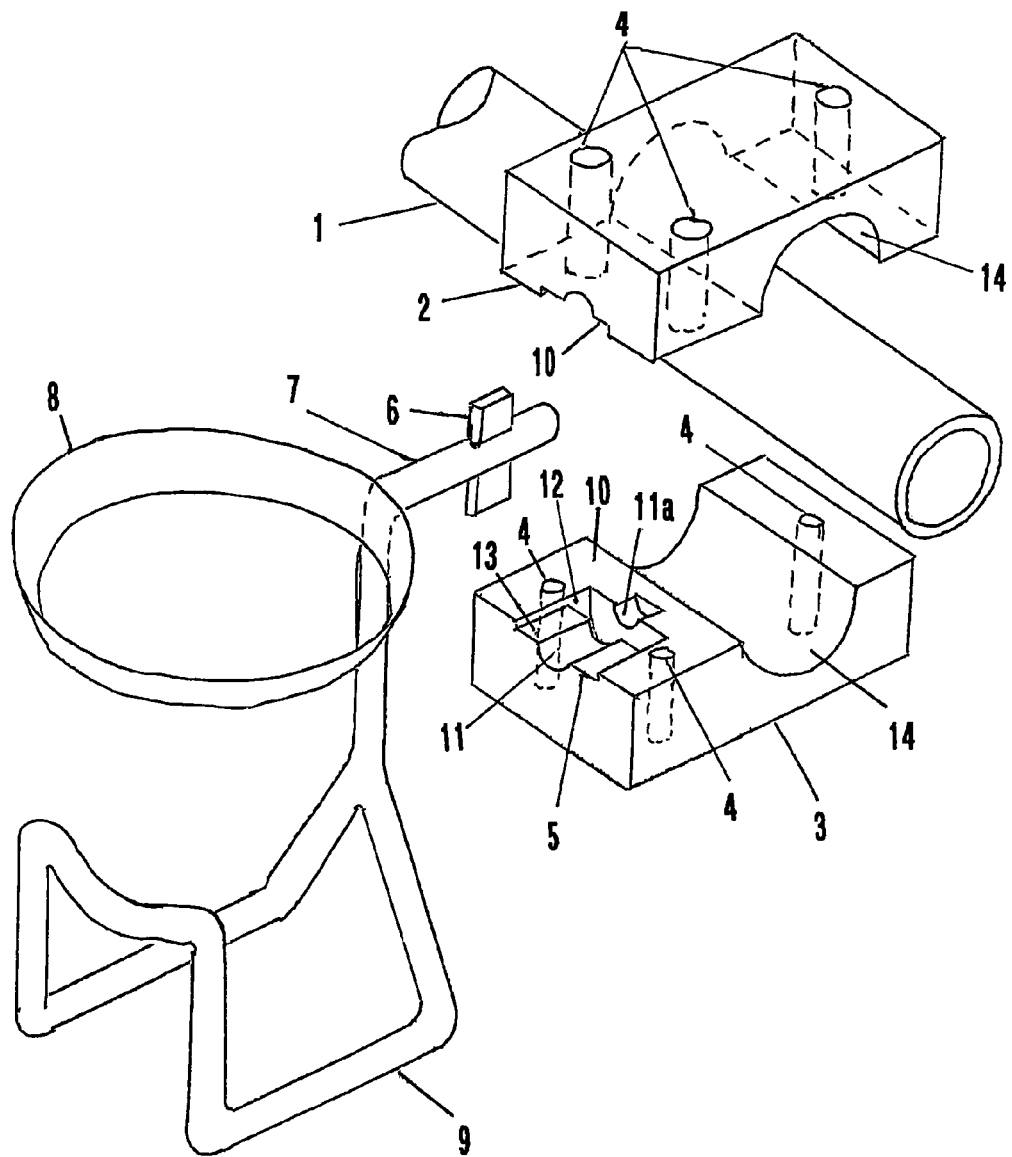
FIG. 1: Is an exploded perspective view of drink container holding apparatus.

Referring to FIG. 1, one embodiment of a drink container holding apparatus is shown for attachment to a part of an object such as a tubular or rectilinear section 1 which may be part of a vehicle, for example, such as an automobile, watercraft, pram, buggy, wheelchair, bicycle, lawn mower or golf trundler. The object may alternatively comprise a stationary item such as an exercise machine or item of office equipment.

The apparatus broadly includes two main elements, being an object attachment device and a drink container holder. In the embodiment shown in FIG. 1 the object attachment device is provided in the form of a bracket which preferably is provided in two parts 2 and 3 to attach about an object in the form of tube 1. In the embodiment shown in FIG. 1 the holder has a frame 9. The holder in use holds or carries the drink container which may be a cup or bottle for example, and engages with the bracket portions as will be described further below. Those skilled in the art will appreciate that the apparatus may be used to hold objects other than drinking containers.

The bracket can be made of a variety of materials, but is most preferably made of a plastic or metallic material, for example an alloy, which may be cast or machined, for example, into a desired form such as that shown in the drawing figures. The bracket in the embodiment shown in FIG. 1 is designed for attachment to a nominated tubular or rectilinear section such as tube 1. The rectilinear section could be hollow or solid and the bracket is intended to create a frictional engagement with the section 1, preferably without damaging the section or requiring any special machinery or specialized technique for assembly. As shown in FIG. 1, the bracket is preferably provided in two parts. However, more parts may be provided if desired. Also, the bracket could be manufactured from a single unitary piece of material which has sufficient inherent movement or flexibility to enable a bracketing action to be achieved. For example, an integral or living hinge could be provided in the material from which the bracket is manufactured. As shown in the drawing, the bracket may be easily removed from the section 1 if required.

The bracket includes removed sections generally referenced 10. In the embodiment shown in FIG. 1 these are substantially the same in each part of the bracket, however, they could be different if desired. The recesses 10 include shaft receiving portions 11 and 11*a*, an extended recess 12 and an entry recess 13. The shaft recess 11 and entry recess 13 together define a slot 5 when the bracket portions are connected together. Although the shaft receiving recess 11*a* is provided, it will be seen that this is not essential.

The recess portions 10 may be formed in a variety of ways, for example by casting or machining.

Those skilled in the art will realise that the bracket can be constructed so as to fit a variety of pipe or section sizes. Also, various packers, for example rubber or plastic packers may be used to ensure a tight fit between the section and the bracket even if the pipe section size is less than the finished production internal diameter size of the bracketing portion of the bracket formed by bracketing recesses 14. It will be seen that in the preferred embodiment the bracket is reversible (i.e. can be used upside down) so that it may be affixed to the left or right hand side of a device, such as a pram, to suit the preference of the end-user. Apertures 4 provide locations for suitable fasteners (not shown) such as screws, bolts or the like which may be used to fasten the bracketing portions together about section 1.

The holder is designed to hold a variety of different liquid receptacles. These may be supported by ring 8 for example which could be provided alone without the remainder of the holder frame 9. Alternatively, the holder frame 9 can be provided alone, or in a different design which is sufficient to carry a desired form of drink container without requiring ring 8. Examples of liquid receptacles or containers that may be carried by the holder include sipper bottles, bicycle drink bottles and paper and plastic vessels as distributed by coffee and convenience stores to hold hot or cold drinks. The holder can hold the bottles or containers upright as shown in the drawing and in preferred embodiments holds them relatively firmly in such a way that they may be removed by lifting vertically from the holder.

The ring 8 can also be configured so as to be of an inverted conical configuration as shown in FIG. 1 whereby it is adapted to hold the other end of a common tapered disposable cup.

The holder includes an engaging portion including a shaft 7 on which one or more projections 6 are provided.

Figure 2:
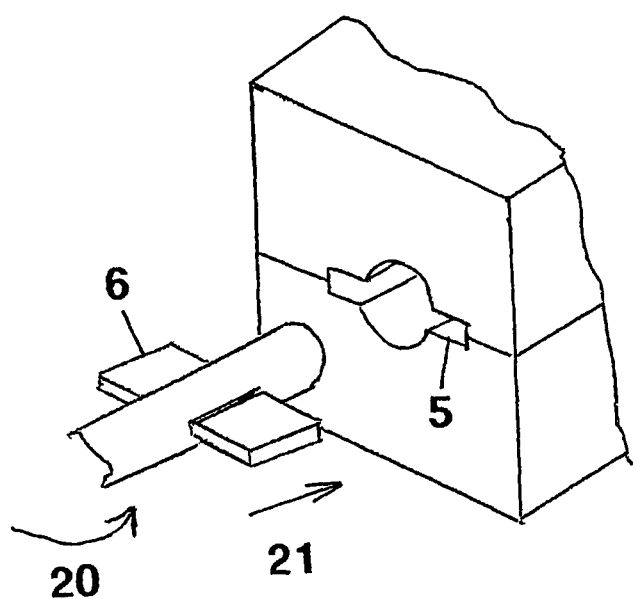
FIG. 2: Is a diagrammatic perspective view illustrating engagement of the apparatus of FIG. 1.
Figure 3:
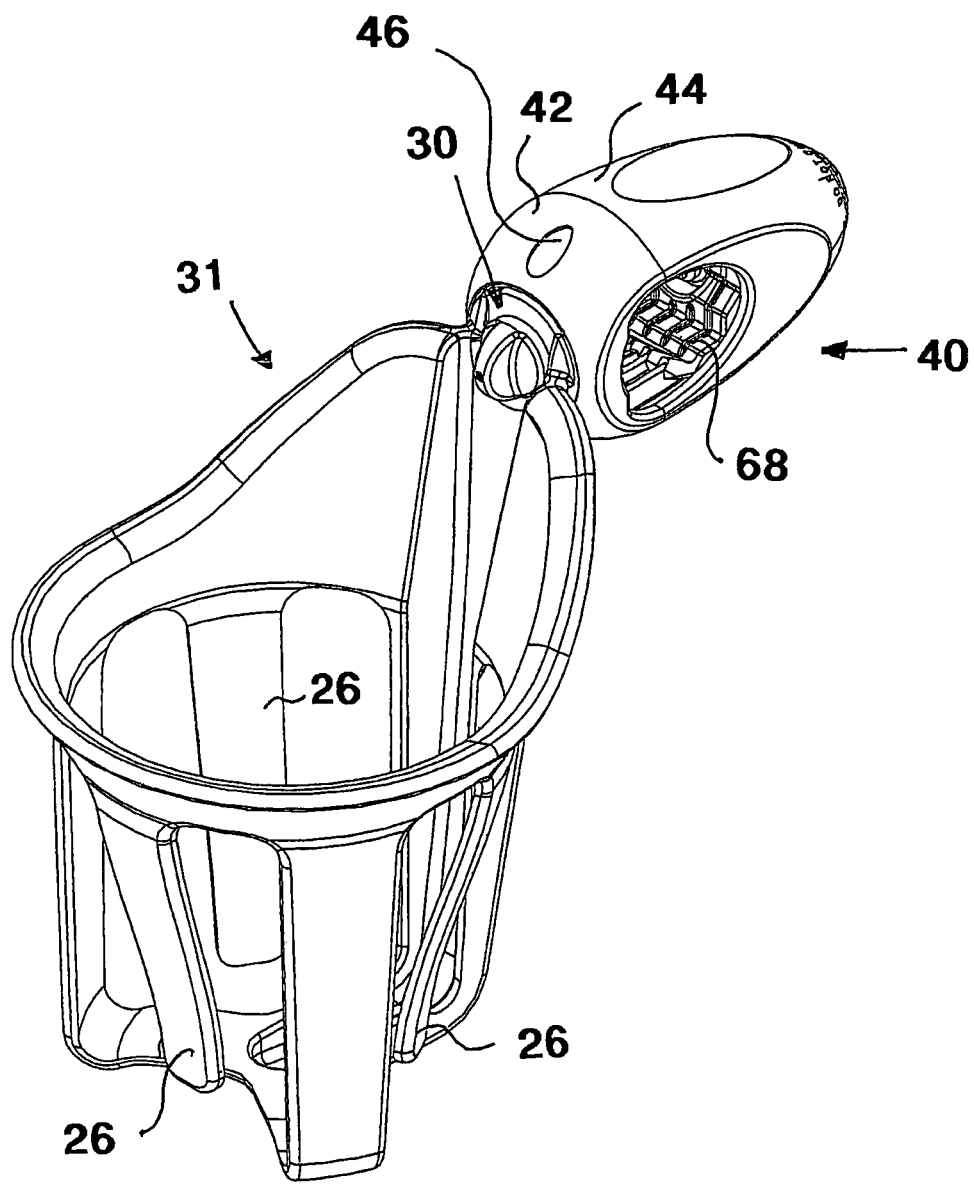
FIG. 3: Is a perspective view of a drink container holder according to a second embodiment of the invention.
Figure 4:
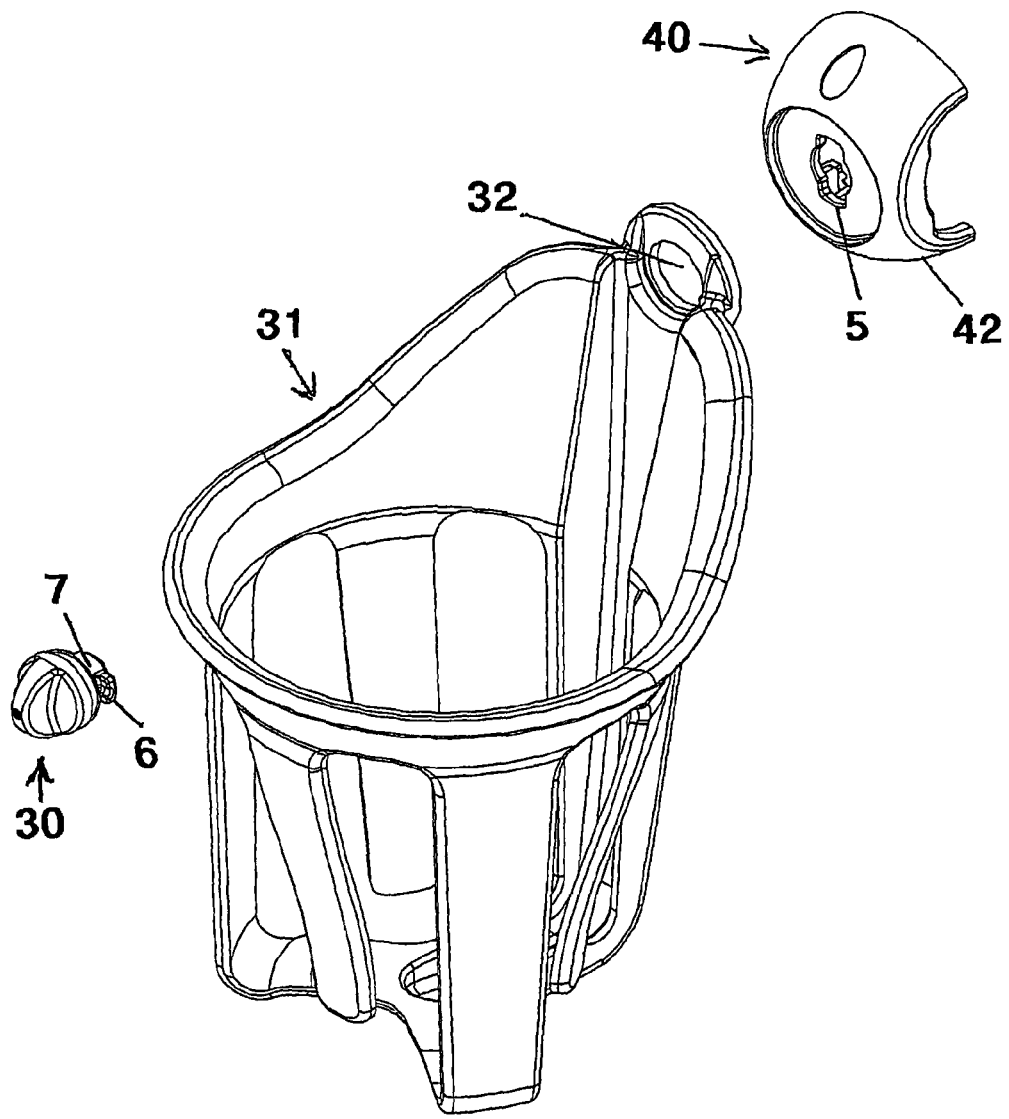
FIG. 4: Is an exploded perspective view of drink container holder of FIG. 3, with a rear part of the bracket not shown.
Figure 5:
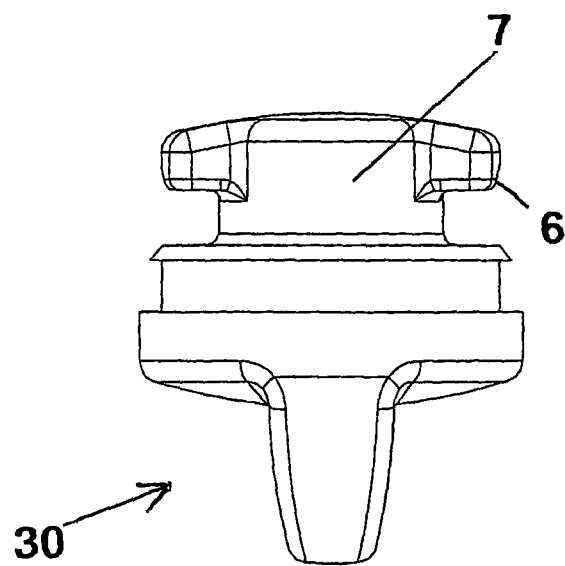
FIG. 5: Is a plan view of the pin or dowel of the drink container of FIG. 3.
Figure 6:
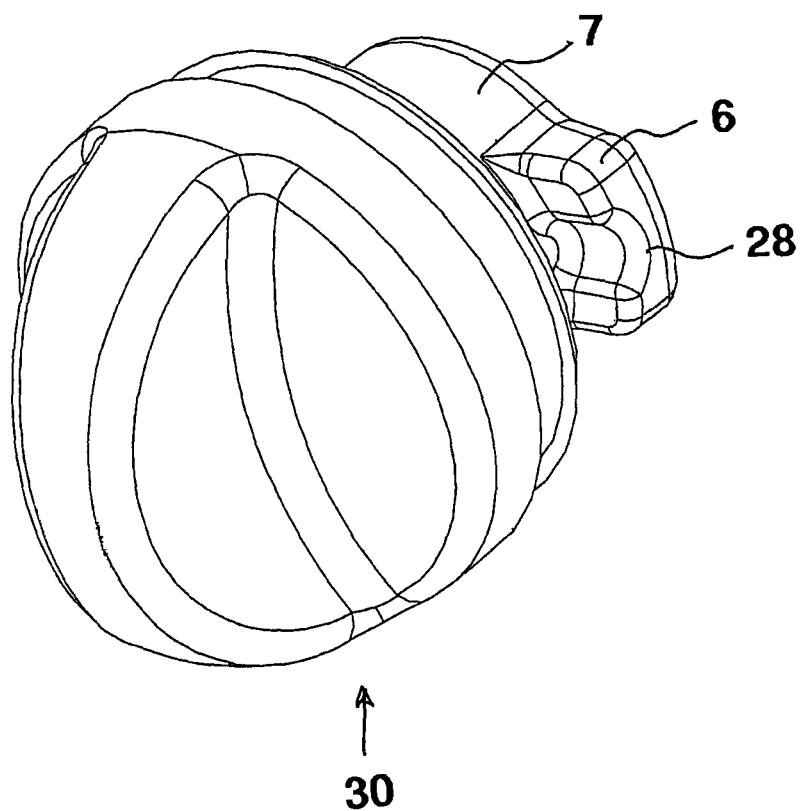
FIG. 6: Is a perspective view of the pin or dowel shown in FIG. 5.
Figure 7:
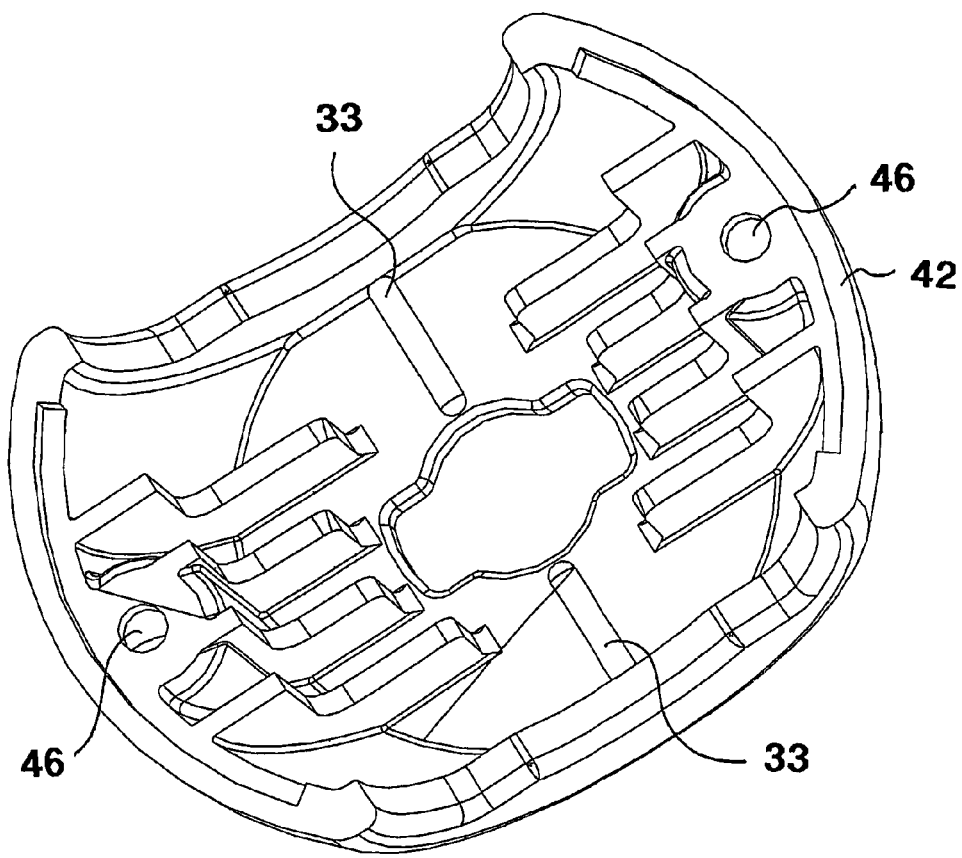
FIG. 7: Is a perspective view of a front housing part of a bracket housing, showing an internal view of that part.
Figure 8:
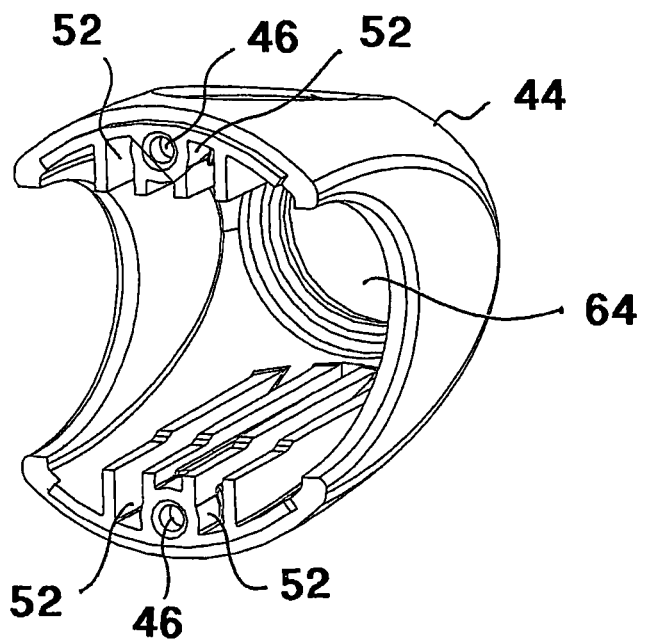
FIG. 8: Is a perspective view of a rear housing part of a bracket housing, showing an internal view of that part.
Figure 9:
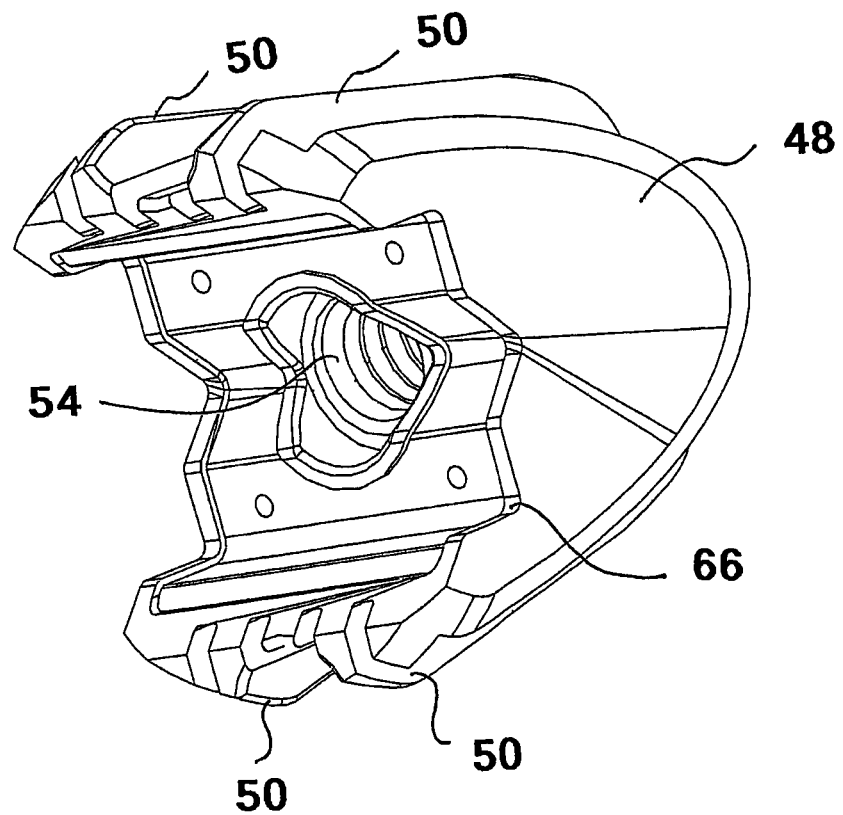
FIG. 9: Is a perspective view of a clamping member for provision within the housing parts of FIGS. 7 and 8.
Figure 10:
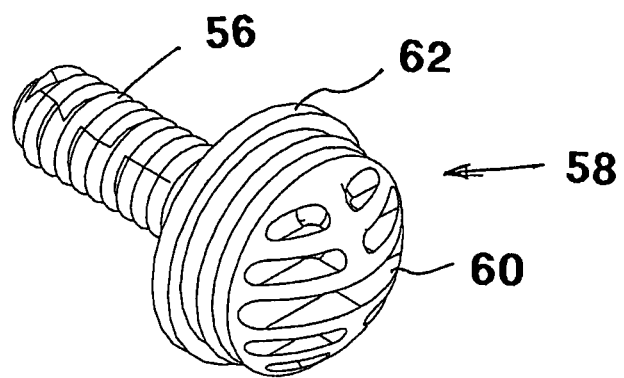
FIG. 10: Is a perspective view of a bolt for engagement with the clamping member shown in FIG. 9.

Referring to FIG. 2, a general engagement process according to preferred embodiments of the invention is shown for engaging the holder and bracket. Firstly, the holder is rotated until it is at an angle whereby the projections 6 are aligned with slot 5 as indicated by arrow 20. When this selected relative angular disposition has been achieved, the holder is moved toward the bracket so that the projections 6 are received within slot 5. This general movement is indicated by arrow 21. The movement continues until the projections 6 are received within the extended recess 12 (refer FIG. 1). Once this orientation has been achieved, and the holder is released, it will tend to rotate to the generally vertical position as shown in FIG. 1. In this position, the projections 6 are securely retained within extended recesses 12, so movement of the holder in a direction opposite to that of arrow 21 will not result in disengagement occurring. Disengagement of the holder from the bracket will only occur when the one or more projections 6 are aligned with the slot 5 as illustrated in FIG. 2 so that movement in a direction opposite that of arrow 21 will allow disengagement to occur.

As can be seen from FIGS. 1 and 2, the holder is free to move angularly, i.e. rotatably, in a plane which will be generally parallel to a longitudinal axis of any cup or bottle held in the holder. When the apparatus is affixed to a handle of a pram, for example, any drink which is held in the holder will be maintained in a substantially upright position despite rocking movement of the pram. Therefore, contents of bottles are unlikely to be spilt from the holder. In the embodiment of FIG. 1, the arrangement is such that disengagement will not naturally occur unless the holder is rotated to an approximately 90 degree position in the embodiment shown in the drawings. Those skilled in the art will appreciate that the slot 5 may be provided at other orientations, for example a 45 degree orientation from which the holder will still be unlikely to be released during natural use of the apparatus.

Referring next to FIGS. 3 to 10, in an alternative embodiment of the invention the attachment device engaging portion is in the form of a pin or dowel 30 which is separable from the holder, generally referenced 31. The pin or dowel 30 includes a shaft 7 on which one or more projections 6 are provided. The holder 31 as shown in FIGS. 3 to 10 preferably includes one or more resilient fingers 26 which facilitate location and retention of a container with the holder. The attachment device engaging portion is an attachment device connector for attaching to a section 1.

The pin or dowel 30 can be inserted through an aperture 32 in the holder 31 and can engage a holder engagement portion which includes a slot 5 in a bracket, generally referenced 40. As the pin or dowel 30 can be rotated independently of the holder 31, the holder need not be rotated to align the projections 6 with the slot 5.

The pin or dowel 30 is an attachment device connector and the slot 5 is a holder connector.

In a preferred embodiment the pin or dowel 30 may be rotated within the slot 5 until depressions 28 in the projections 6 engage with one or both projecting ribs 33 on an internal surface of the bracket adjacent to the slot 5. This prevents accidental rotation of the pin 30 when the holder 31 is moved relative to the bracket. In this configuration the holder 31 may be rotatable through a full 360° range of rotation relative to the bracket 40, without the projections 6 aligning with the slot 5 such that the pin 30 can disengage from the bracket 40. This may be particularly convenient when the tubular or rectilinear section (not shown) to which the apparatus is to be engaged is close to vertical in orientation. Thus, the slot 5 and the surrounding region is a holder connector for the attachment device engaging portion.

The bracket 40 shown in the embodiment of FIGS. 3 to 10 includes a housing generally comprising two parts, a front part 42 and a rear part 44. Apertures 46 are provided in the front and rear parts to allow them to be engaged with each other about an object such as tube or section 1 using appropriate fasteners such as nuts and bolts or screws, for example. Within the housing formed by parts 42 and 44 a moveable clamping member 48 is provided having one or more guiding projections 50 that locate between recesses 52 to guide movement of the clamping member in use. A threaded aperture 54 is provided in the clamping member for receiving the shaft 56 of a bolt 58 that has a corresponding thread. Bolt 58 has a head 60 that includes a flange 62 which sits within an aperture 64 of the second housing part 44. Therefore, head 60 of the bolt can be accessed through aperture 64 to turn the bolt, for example by using an appropriate tool such as a screwdriver or a coin for example. Turning bolt 58 in the appropriate direction moves the clamping member along the housing to engage a front face 66 of the clamping member with an object such as tube or section 1. The face 66 may include a friction enhancing component, such as an overmoulded component 68 (refer to FIG. 3) formed from a resilient material and including a number of teeth or projections. The other side of the tube or section 1 is engaged by internal surfaces of the front housing part 42.

In a further embodiment (not shown), a pin or dowel may be provided which is rotatable independently of the holder, but which is engaged with the holder such that it cannot be separated therefrom, thereby avoiding the risk of losing or damaging the pin or dowel.

Figure 11:
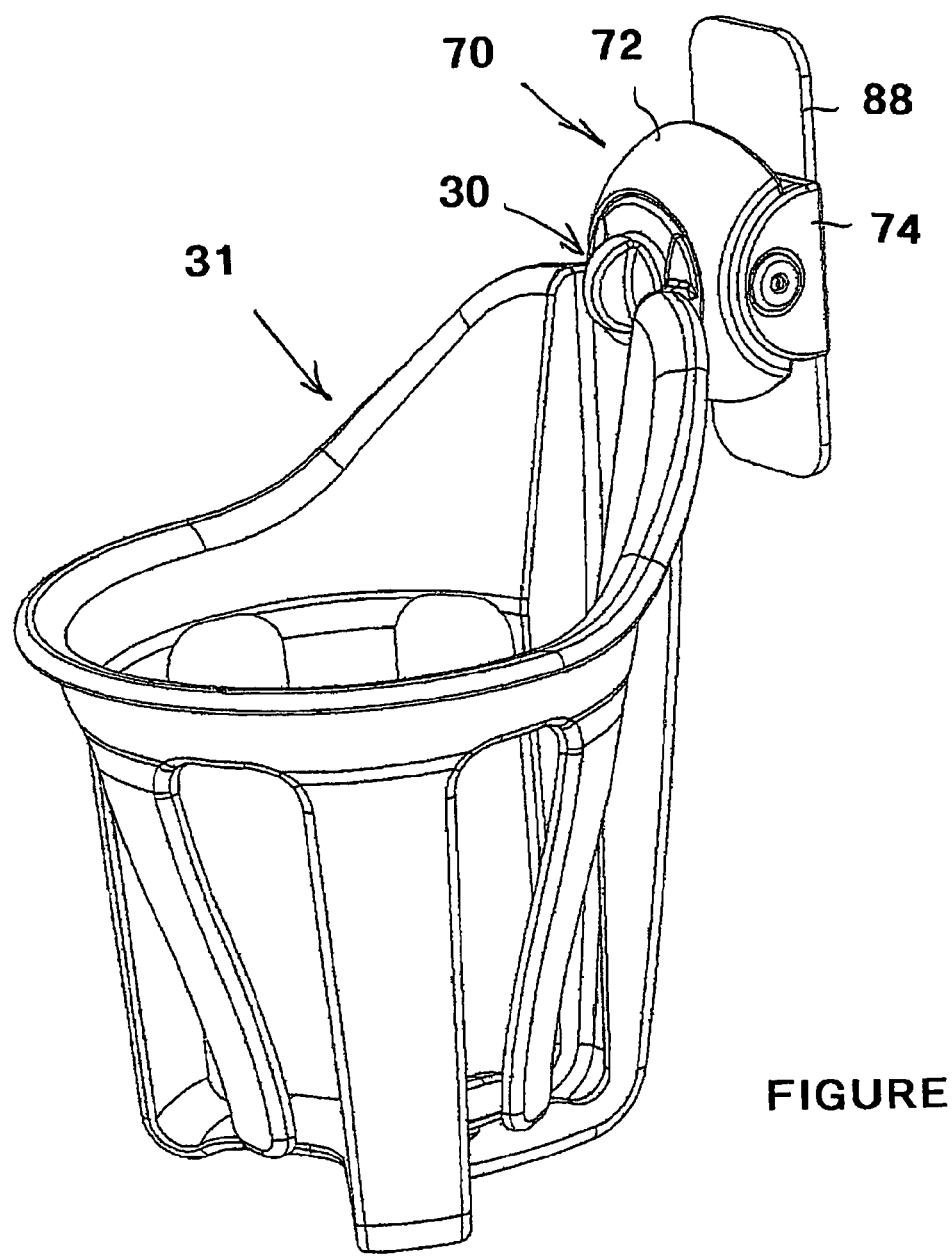
FIG. 11: is a perspective view of another embodiment of a drink container holding apparatus.
Figure 12:
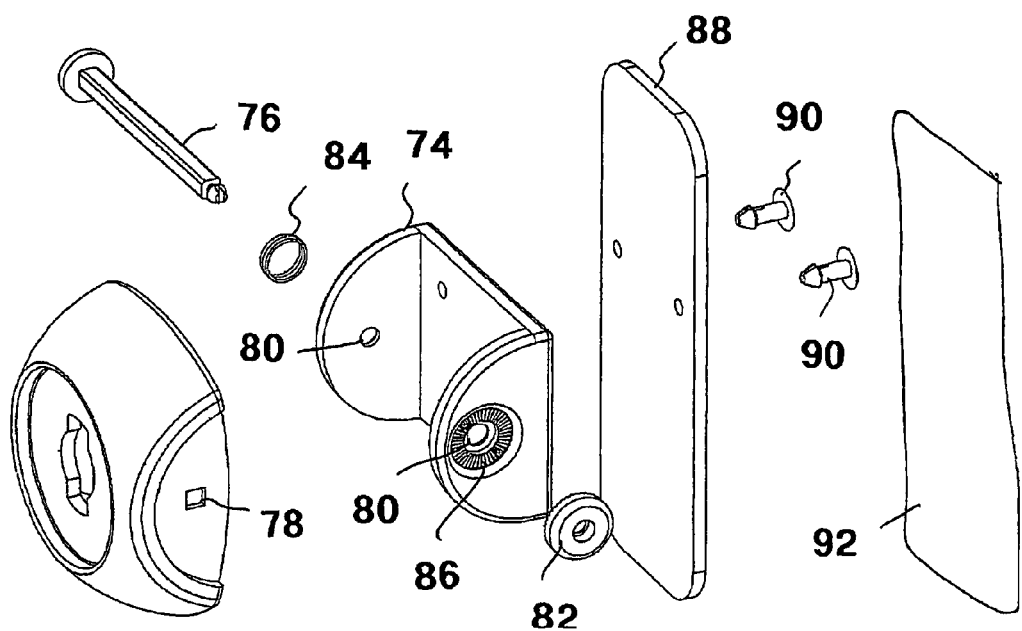
FIG. 12: is an exploded view of an object attachment device for the apparatus of FIG. 11.
Figure 13:
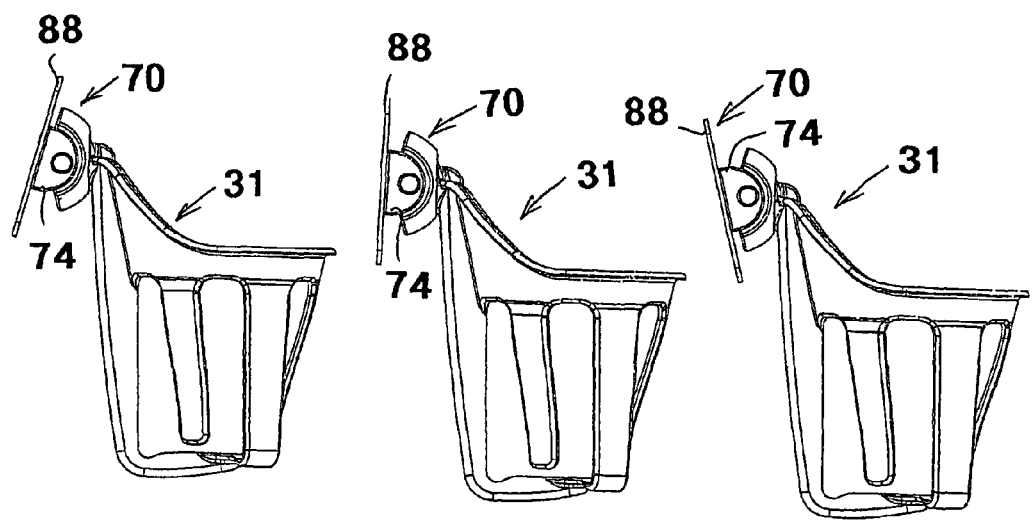
FIG. 13: is a series of side elevations of the apparatus of FIG. 11, showing a range of angular movement.
Figure 14:
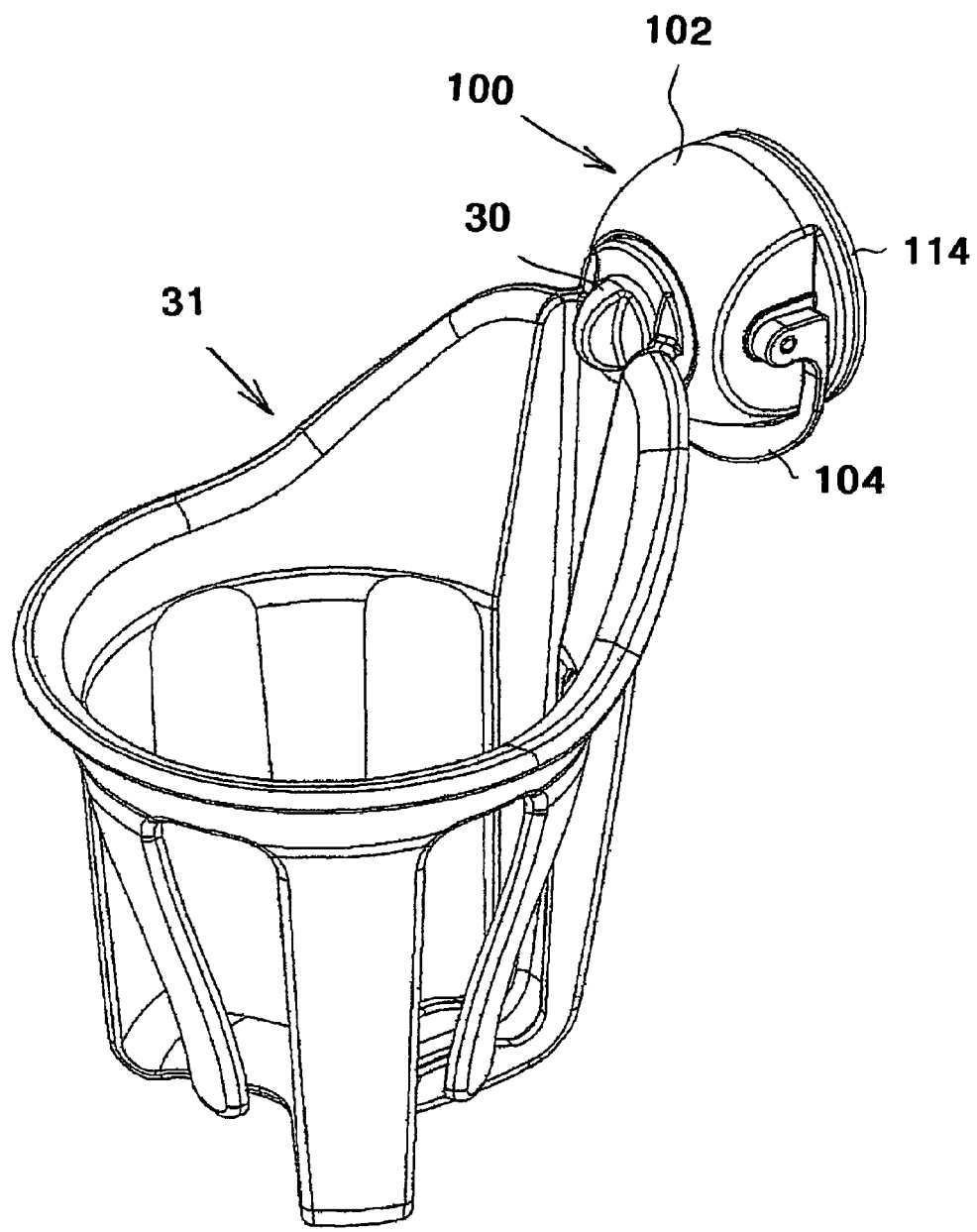
FIG. 14: is a perspective view of another embodiment of a drink container holding apparatus.
Figure 15:
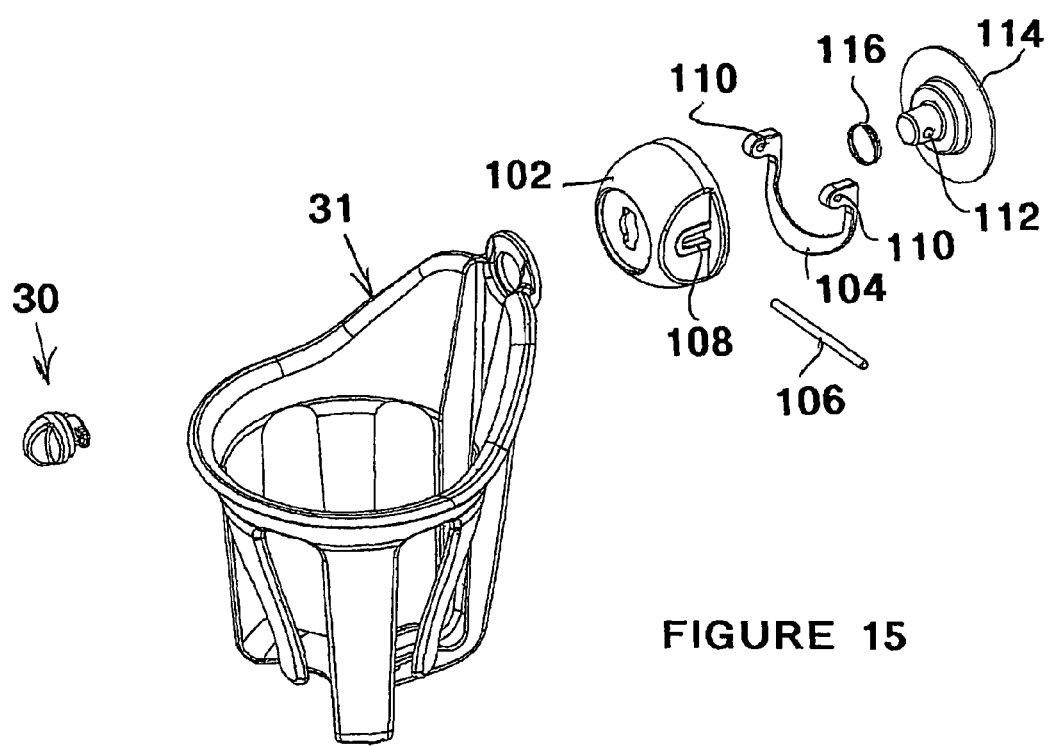
FIG. 15: is an exploded perspective view of the apparatus of FIG. 14.
Figure 16A:
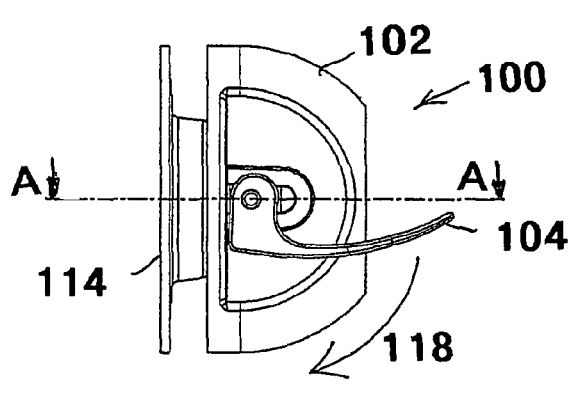
FIG. 16*a*: is a side elevation of an object attachment device for the apparatus of FIG. 14 in a disengaged orientation.
Figure 16B:
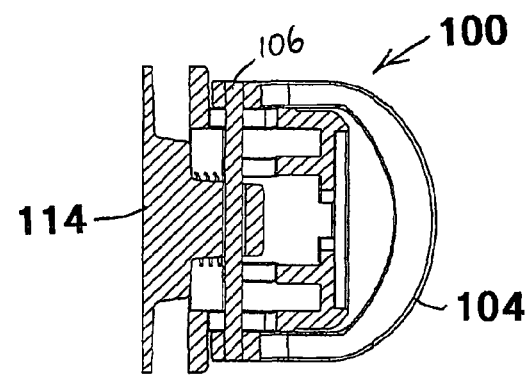
FIG. 16*b*: is a plan view in cross section through line AA of FIG. 16*a*.

Another embodiment of the invention is shown in FIGS. 11 to 13. Features of the embodiment shown in FIGS. 11 to 13 which are the same as or similar to features described in foregoing embodiments referred to herein have like reference numerals. Referring to FIGS. 11 to 13, the holder 31 is engaged with an object attachment device generally referenced 70. Front hosing part 72 of the attachment device has the same form as front part 42 of the bracket 40 described above and the attachment arrangement between the holder and part 70 including pin 30 is the same as described above with reference to FIGS. 3 to 10. The front housing is pivotally connected to a bracket 74 by means of pin 76 which is located through apertures 78 and 80 in part 70 and the bracket 74 respectively. A nut 82 is fixedly engaged with the end of pin 76 to retain the pin, and a spring or similar biasing device 84 maintains the nut 82 in engagement with contoured surface 86. A corresponding contoured surface (not shown) is provided on an inner face of the nut 82. This provides a frictional engagement that can be used to maintain part 72 in a desired angular orientation about pin 76 relative to the bracket 74. A plate 88 provides a base on which bracket 74 may be mounted using pins 90. The plate 88 allows the apparatus to be attached to an object. In the preferred form, the rear side of plate 88,has an adhesive applied to it to allow attachment to the object. This may take the form of a double-sided adhesive tape or sheet 92.

Use of the embodiment described in FIGS. 11 to 13 is as follows. An appropriate surface is selected, preferably a relatively smooth surface such as glass, Formica™, laminated plastic resin, fibreglass, lacquered wood, polished rock (granite etc) or car dashboard products. The surface may have slight dimples or have a granular or grained surface or be otherwise contoured, but is preferably capable of receiving an adhesive product. The assembled part 70, which includes plate 88 with the adhesive exposed on the rear side, is then placed on the receiving surface that the apparatus is proposed to be fitted to. In the preferred embodiment plate 88 is somewhat malleable or flexible, allowing it to be adhered to receiving surfaces that include a degree of curvature or undulation. Pressure is applied according the manufactures recommendations of the adhesive tape for a time period as also indicated by the manufacturers to suit the adhesive product.

Once part 70 has been applied the angle is adjusted so that the front face of front part 72 is substantially vertical then the holder and pin 30 can be inserted and locked in place, allowing the holder to move 360 degrees relative to the assembly 70.

As can be seen from FIG. 13, the holder can pivot relative to the object attachment device in a plane perpendicular to the selected plane in which pin 30 allows the holder to rotate. The apparatus can be maintained in a variety of desired positions using the frictional locking assembly provided by nut 82 and surface 86.

Removal of the apparatus from an object is the reverse of the installation operation described above, however the attachment portion 70 is fixed permanently to the surface to which it has been applied. Should entire removal be desired the front housing 72 can be removed by removal of the pin 76, and then the clips 90 can be snapped leaving only the plate 88 still fixed to the surface, such as a dashboard for example.

The components described above are preferably constructed from Injection moulded plastic or rubber or similar materials. Plate 88 may be made from a malleable metal such as soft aluminium. Those skilled in the art to which the invention relates will realise that other materials may be used.

Referring now to FIGS. 14 to 17*b*, another embodiment is shown. Again, features of the embodiment shown in FIGS. 14 to 17*b* which are the same as or similar to features described in foregoing embodiments referred to herein have like reference numerals. The holder 31 is engaged with an object attachment device generally referenced 100. Front housing part 102 of the attachment device has the same form as front part 42 of the bracket 40 described above and the attachment arrangement between the holder and part 100 including pin 30 is the same as described above with reference to FIGS. 3 to 10. The front housing is pivotally connected to a lever 104 by means of pin 106 which is located through apertures 108 and 110 in part 102 and the handle 104 respectively. Pin 106 also passes through an aperture 112 in the stem of a suction cup 114. A spring 116 biases the suction cup away from member 102.

Figure 17A:
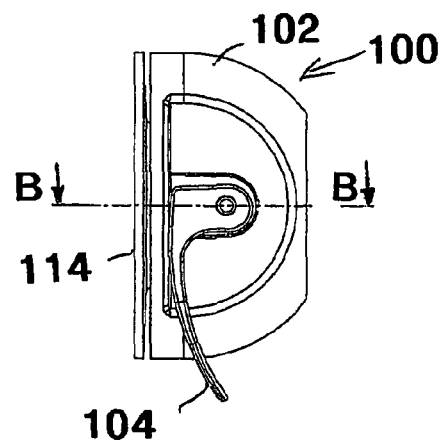
FIG. 17*a*: is a side elevation of an object attachment device for the apparatus of FIG. 14 in an engaged orientation.
Figure 17B:
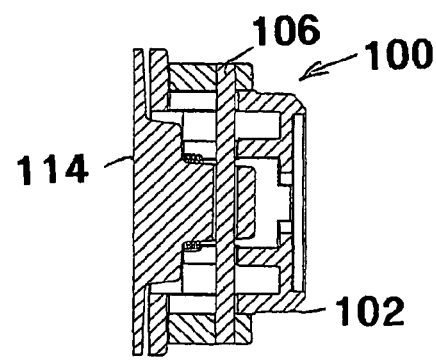
FIG. 17*b*: is a plan view in cross section through line BB of FIG. 17*a*.

Operation of the embodiment shown in FIGS. 14 to 17b is as follows. An appropriate substantially smooth surface is selected, such as glass, Formica™, laminated plastic resin, fibreglass, lacquered wood, polished rock (granite etc). The assembly 100 is then placed on the surface so that the suction cup 114 is in contact with the surface in the position shown in FIGS. 16a and 16b. The lever 104 is moved in a direction shown by arrow 118 which draws the stem of the suction cup toward the housing part 102 against spring 116 as shown in FIGS. 17a and 17b. This creates a vacuum between the suction cup and the surface in the known way, thus adhering the assembly 100 to the surface.

The holder is connected to the assembly 100 using pin 30 as described above and can swivel through 360 degrees. Although the assembly can be oriented in any direction, it is preferred that the lever 104 is disposed downwardly to prevent inadvertent disengagement. Alternatively, a locking mechanism such as a catch may be used to prevent inadvertent disengagement. Furthermore, a second pivotal axis may be provided to accommodate variations in the angle of the surface relative to the vertical, as present in the embodiment of FIGS. 11 to 13, and in particular as shown in FIG. 13.

Reversal of the installation process allows the apparatus to be uninstalled.

The components in this embodiment are preferably manufactured from injection moulded plastic, rubber or similar materials, however other suitable materials may be used.

Where in the foregoing description reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims. In this document, the word "comprising" and variants such as "comprise" or "comprises" is to be interpreted in an inclusive sense rather than in a limiting sense.

The invention claimed is:

1. A drink container holding apparatus, comprising:
 an object attachment device adapted for attachment to an object and including a holder engagement portion; and
 a drink container holder including an attachment device engagement portion to engage with the holder engagement portion,
 wherein the holder engagement portion and the attachment device engagement portion, when engaged, allow free relative angular movement between the object attachment device and the drink container holder in a selected plane, and
 wherein the drink container holder and the object attachment device are engaged or disengaged by orientating the holder engagement portion and the attachment device engagement portion in a pre-determined relative angular disposition in the selected plane and moving the attachment device engagement portion and holder engagement portion relative to each other in a direction perpendicular to the selected plane to effect the engagement or disengagement.

2. A drink container holding apparatus according to claim 1, wherein the drink container holder rotates relative to the object attachment device without rotating the attachment device engagement portion.

3. A drink container holding apparatus according to claim 1, wherein the drink container holder is rotatable through 360° in the selected plane relative to the object attachment device without the pre-determined relative angular disposition of the holder engagement portion and the attachment device engagement portion occurring.

4. A drink container holding apparatus according to claim 1, wherein the attachment device engagement portion is separable from the drink container holder.

5. A drink container holding apparatus according to claim 1, wherein the holder engagement portion includes a receptacle having an entry slot and the attachment device engagement portion includes a projection adapted to pass through the entry slot.

6. A drink container holding apparatus according to claim 5, wherein the object attachment device comprises a bracket provided in at least two parts and wherein the at least two parts of the bracket are fastened to each other about a part of the object to which the apparatus is attached in use.

7. A drink container holding apparatus according to claim 6, wherein each said part of the bracket includes a fastening recess adapted to be provided about the part of the object in use.

8. A drink container holding apparatus according to claim 6, wherein the object attachment device further includes fastening means for fastening the parts of the bracket together.

9. A drink container holding apparatus according to claim 5, wherein the projection is provided on a shaft that can pass through the entry slot.

10. A drink container holding apparatus according to claim 9, wherein the receptacle includes support means for receiving and supporting a part of the shaft.

11. A drink container holding apparatus according to claim 9, wherein the projection includes two projecting portions, one portion projecting from either side of the shaft and the projections being substantially opposed.

12. A drink container holding apparatus according to claim 5, wherein the entry slot is oriented so that it is at an angle of substantially 45 degrees to 90 degrees to the orientation of the projection when the attachment device engagement portion is engaged to the holder engagement portion to retain the drink container holder in use to the object attachment device.

13. A drink container holding apparatus according to claim 1, wherein the drink container holder includes a ring for receiving a drink container.

14. A drink container holding apparatus according to claim 1, wherein the drink container holder includes a frame to carry or hold a drink container.

15. A drink container holding apparatus according to claim 1, further comprising a pivot means wherein the holder can pivot relative to the object attachment device in a plane perpendicular to the selected plane.

16. A drink container holding apparatus according to claim 1 wherein, the object attachment device comprises an adhesive surface for attachment of the object attachment device to an object.

17. A drink container holding apparatus according to claim 1, wherein the object attachment device further comprises a suction cup for attachment of the object attachment device to an object.

18. A drink container holding apparatus as claimed in claim 17, wherein the object attachment device includes a lever operable to move at least a part of the suction cup relative to the object attachment device to form a vacuum between the suction cup and a surface of the object to thereby attach the object attachment device to the object.

* * * * *